G. UHLIG.
HOOK.
APPLICATION FILED JULY 2, 1915.

1,176,110.

Patented Mar. 21, 1916.

Witnesses
Hugh H. Ott
F. Hough

Inventor
George Uhlig
By Victor J. Evans
Attorney

UNITED STATES PATENT OFFICE.

GEORGE UHLIG, OF DES MOINES, IOWA.

HOOK.

1,176,110.      Specification of Letters Patent.      Patented Mar. 21, 1916.

Application filed July 2, 1915. Serial No. 37,748.

*To all whom it may concern:*

Be it known that I, GEORGE UHLIG, a citizen of the United States, residing at Des Moines, in the county of Polk and State of Iowa, have invented new and useful Improvements in Hooks, of which the following is a specification.

This invention relates to a hook for use in connection with the ring upon the scale beams of artillery pieces and the like.

The primary object of the invention has been to provide a device of the class described, which permits the ring upon the scale beam of the artillery piece to be easily and quickly connected with or disconnected from the hook, as occasion may require.

A still further object of the invention is to provide a body having a hook thereon of such configuration as to enable the hook to coöperate with the body to render the disengagement of the ring of the scale beam from the hook, when connected therewith, almost impossible irrespective of the position which the ring may assume.

With these and other objects in view the invention resides in the novel combination and arrangement of parts which will be hereinafter more fully described and particularly pointed out in the claim.

The preferred embodiment of the invention has been illustrated in the accompanying drawing, although no restriction is necessarily made to the precise details of construction therein shown, as changes, alterations and modifications within the scope of the appended claim may be resorted to when desired.

Figure 1:
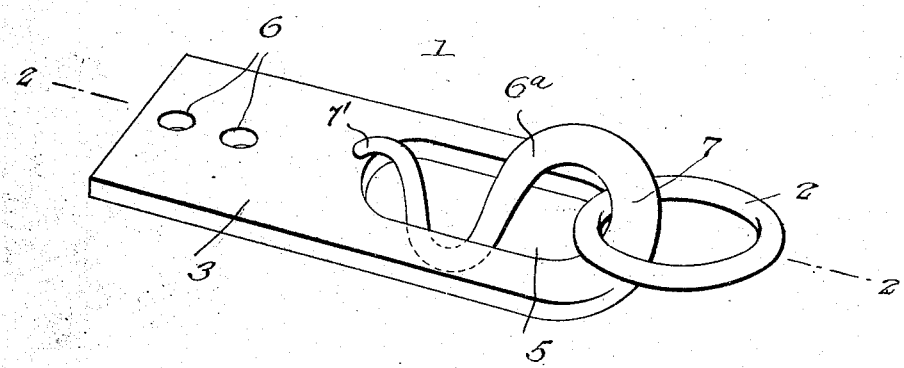
Figure 2:
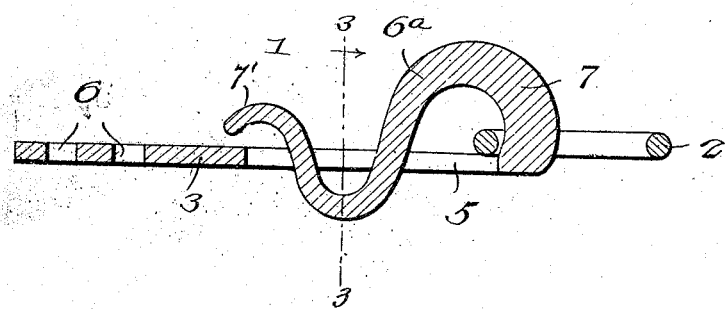
Figure 3:
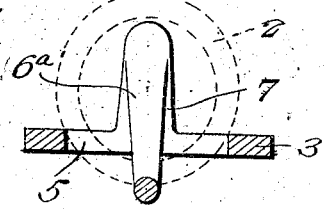

In the drawing:—Figure 1 is a perspective view of the improved hook constructed in accordance with the invention, a scale beam ring being shown connected therewith. Fig. 2 is a vertical longitudinal sectional view on the line 2—2 of Fig. 1. Fig. 3 is a vertical transverse sectional view on the line 3—3 of Fig. 2, the scale beam ring being shown in dotted lines.

Like characters of reference denote corresponding parts throughout the several views in the drawing.

The numeral 1 designates the improved hook, while the numeral 2 indicates the ring of a scale beam, with which the hook is adapted to be connected.

The hook 1 comprises a rectangular shaped body having an elongated aperture adjacent one end thereof, as indicated at 5, said aperture extending longitudinally of the body 3. The opposite end of the body from that which contains the aperture 5 is provided with spaced and alined apertures 6, adapted to receive bolts or other fastening elements when the hook body is to be secured to a device which is attachable to the ring upon the scale beam of a piece of artillery.

Formed integrally upon the end of the body containing the aperture 5 is a keeper 6ᵃ of goose-neck configuration which is axially alined with the body 3 and extends above and below said body through the aperture 5. The portion of the keeper which is formed integral with the end of the body of the hook, is bent upwardly and terminates in a downwardly extending portion which passes through the aperture 5 at a point approximately intermediate the ends of the opening and extends below the under side of the body, said downwardly extending portion and the end of the keeper formed integrally with the body coöperating with the side walls of the aperture 5 to provide a ring receiving loop 7, in which is normally disposed the scale beam receiving ring 2 when the hook is connected therewith. The downwardly extending portion of the loop 7 is again bent upwardly through the aperture 5 in the body and terminates in a curved free end or bill 7', which is in spaced relation with the body 3 adjacent one end of the aperture 5. The upwardly extending portion of the keeper terminates in the bill and coöperates therewith to form a combined guide and guard to assist in positioning the ring within the keeper and prevent the accidental disengagement of the ring from the keeper when being moved to a position within the ring receiving loop 7.

With reference to Fig. 2 in the drawing it can easily be seen that the upwardly extending portion of the keeper which merges into the bill 7' coöperates with the bill to normally close the passage way leading to the ring receiving loop 7, and also enables the ring to be positioned within the loop by the use of one hand of the person attaching the device to a scale beam of a piece of artillery. Furthermore it is apparent that the contour of the keeper enables the keeper to co-act with the aperture in the end of the body to provide a passage way which will not be clogged by ice in freezing weather.

From the foregoing description taken in connection with the accompanying drawing, it is at once apparent that a device of the class described has been provided, which is inexpensive of manufacture, simple in construction, and highly efficient in use.

Having thus described the invention what is claimed as new is:—

A device of the class described comprising a flat rectangular shaped plate having an elongated longitudinally extending passage near one end, a tapering keeper having one end formed integral with one end of the plate, said keeper being convoluted throughout its length with the convolutions gradually decreasing in height and width toward the free end of the keeper to provide a combined guide and guard having a yieldable end spaced above said plate beyond the passage therein.

In testimony whereof I affix my signature in presence of two witnesses.

GEORGE UHLIG.

Witnesses:
GEORGE WAMBACH,
A. J. HAVILAND.